July 25, 1972 H. M. RIVERS 3,679,543
CONTROLLING THE COOKING PROCESS IN PULP DIGESTION
BY DIFFERENTIAL CONDUCTIVITY MEASUREMENTS
Filed Aug. 18, 1970

INVENTOR
Hubert M. Rivers

United States Patent Office 3,679,543
Patented July 25, 1972

3,679,543
CONTROLLING THE COOKING PROCESS IN PULP DIGESTION BY DIFFERENTIAL CONDUCTIVITY MEASUREMENTS
Hubert M. Rivers, Upper St. Clair Township, Allegheny County, Pa., assignor to Calgon Corporation
Continuation-in-part of application Ser. No. 717,564, Apr. 1, 1968. This application Aug. 18, 1970, Ser. No. 64,676
The portion of the term of the patent subsequent to Jan. 5, 1988, has been disclaimed
Int. Cl. D21c 7/12
U.S. Cl. 162—49
8 Claims

ABSTRACT OF THE DISCLOSURE

A method is provided for automatically controlling the cooking process in a pulp digester by determining the differential conductivity of the liquor in said digester at spaced stages in the cooking process and adjusting one of the control variables temperature, time of processing and liquor strength including the hydroxide concentration in the bath from a curve of conductivity differences versus concentration previously prepared.

---

Figure 1:
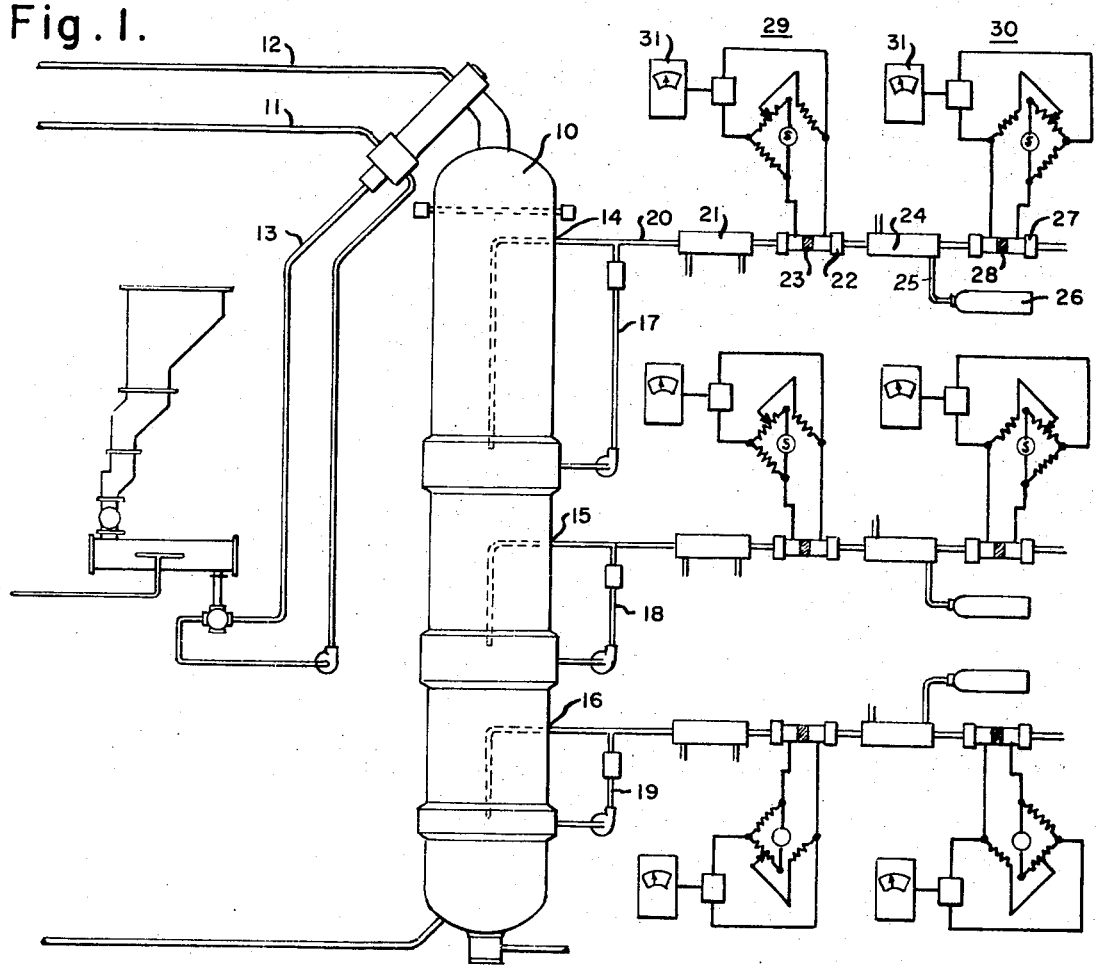

This application is a continuation-in-part of my copending application Ser. No. 717,564, filed Apr. 1, 1968, now Pat. No. 3,553,075.

This invention relates to pulp digester controls and methods of pulp digesting and particularly to controls for alkaline pulp digesters for controlling the level of alkalinity throughout the cooking process.

It has long been recognized that alkaline digested wood pulp and the like material could be materially improved if the alkalinity in digester could be precisely controlled throughout all stages of the digestion process. Being comparatively slow and cumbersome, ordinary analytical methods are of limited utility in modern digester operation and, as a result, no entirely satisfactory method of control has been available for such equipment. At the present time, substantially all controls are centered at the beginning of the operation but the uncontrollable variables involved in the system are so great as to make this system unstable and not readily amenable to automatic controls. The operator is never able to ascertain at the beginning an accurate figure for moisture release, superficial moisture, softness of the wood, reactivity of the chips and even to have any real control of the initial chemical impregnation of the chips. All of these factors have a very marked effect on the cooking process, on the operation of the digester, and, consequently, on the quality of the finished product.

In order to have any effective control of digester operation, the operator must have some analytical means for rapidly and accurately monitoring the digestion process as it progresses in the digester. Up to the present time, no effective analytical means for accomplishing this objective has been available.

The problems involved are generally described in an article by K. E. Vroom in "Pulp and Paper Magazine of Canada" convention issue 1957, pages 228–231 and by Hermann F. J. Wenzl and O. V. Ingruber in "Paper Trade Journal" Oct. 3, 1966, pages 52–57.

I have invented a method of pulp digester control and a control apparatus capable of providing the necessary monitoring of the cooking liquior and thus controlling the cooking process.

Preferably, I measure the conductivity of the cooking liquor, before and after neutralization, at strategic stages throughout the cooking processes. This may be done at some specified moment at the beginning or during the process or at spaced points along a continuous digester or at predetermined time intervals in a batch digester. Preferably, after determining the difference in conductivity before and after neutralization, which I shall hereafter call the differential conductivity, I then alter the processing conditions in the next stage of processing by employing as may be appropriate or required such expedients as adding fresh chemical (e.g., white liquor) or dilution liquor (e.g., weak black liquor) or changing the temperature or the time of reaction. As a further consequence of the measured differential conductivity value or values, the cooking process may be accelerated or decelerated by increasing or decreasing the temperature of the cooking liquor, or the duration of the cooking interval may be increased or decreased as required to satisfy product quality specifications. Preferably, I withdraw a sample of the cooking bath liquor at each of the spaced points or time intervals and measure its conductivity and thereafter I add a buffering-type reagent, such as carbon dioxide, capable of neutralizing certain alkaline constituents of the sample and again measure the conductivity of the reacted sample, determine the differential conductivity between the original and reacted sample and determine the amount of neutralized constituents present from a curve of differential conductivity versus concentration prepared from known concentrations of the same constituents and then make the necessary changes in the next stage of processing.

The apparatus for use in my invention comprises a pulp digester, means for measuring conductivity of the solution in the pulp digester at spaced apart points representing different stages in the cooking process, means for adding a buffering agent to a sample of said solution, means for measuring conductivity of the sample after the addition of the buffering agent and means for determining the difference between the two conductivities to provide a differential conductivity measurement and, finally, means for adjusting at least one of the variables liquor strength including the hydroxide concentration, temperature, time of processing or hydroxide concentration in the next stage of processing to maintain the parameter of the pulp within a previously determined set of limits.

Figure 2:
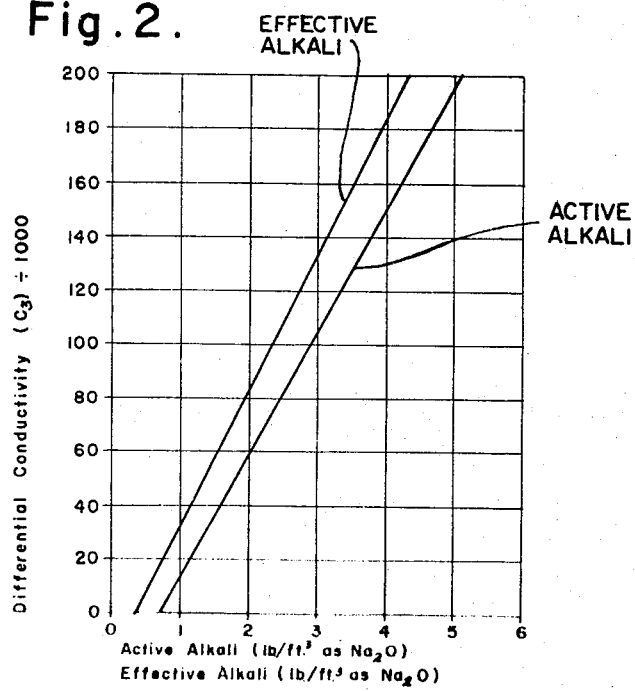

In the foregoing general description of my invention I have set out certain objects, purposes and advantages of the invention. Other objects, purposes and advantages of this invention will be apparent from a consideration of the following description and the accompanying drawings in which:

FIG. 1 is a diagrammatic view of a pulp digester and control apparatus according to my invention; and FIG. 2 is a graph of differential conductivity versus active alkali and versus effective alkali in samples of cooking liquor from a digester such as that shown in FIG. 1.

Referring to FIG. 1, I have illustrated diagrammatically a combination pulp digester of the Kamyr type embodying my invention. Referring to the figure, I have shown a digester 10. Makeup liquor is supplied by a line 11 entering the digester. The digester is heated by steam supplied through a steam line 12. Chips are fed into digester 10 through line 13. Samples may be drawn at spaced apart points 14, 15 and 16 in the digester 10 by means of recirculation lines 17, 18 and 19. Each of the lines 17, 18 and 19 is connected by a line 20 to a heat exchanger 21 in which the sample is cooled to approximately room temperature. The cooled sample is then carried to a conductivity vessel 22 in which is placed a conductivity cell 23 where the conductivity of the sample is first determined. The sample is then removed from the vessel 22 to a neutralizing chamber 24 where $CO_2$ gas is introduced through line 25 from a $CO_2$ tank 26 to neutralize the hydroxide ion (OH—) to bicarbonate ion ($HCO_3$—). The neutralized sample is then removed to a second conductivity vessel 27 carrying a conductivity cell 28 where the neutralized conductivity of the sample is measured. The conductivity cells are connected to conductivity bridges 29 and 30 of usual design and the conductivity of the liquids in each point is measured in the usual fashion and recorded on a two-pen recorder 31 of conventional design. The difference in conductivity or differential conductivity bears a direct relationship to the concentration of hydroxide as shown in FIG. 2. This can be determined by a graph such as that shown in FIG. 2. Alternately, the signals from the two conductivity bridges can be used to energize a signal system which produces a signal corresponding to differential conductivity which can, in turn, be used to regulate the addition of white liquor into the digester or the feed of white liquor into the digester can be controlled manually from the reading on the pen recorder. Alternatively the signal may be used to control the feed of black liquor, the rate of steam feed and thus the temperature or to adjust the rate of processing through the digester or any other condition which affects the operation of the digester.

As an alternate practice of the invention using a single conductivity cell on each of the lines 17, 18 and 19, the following sequence of operation is used:

(1) fill the conductive cell with sample;
(2) measure the initial conductivity $C_1$;
(3) record the original conductivity $C_1$;
(4) introduce $CO_2$ as required for complete neutralization of the sample;
(5) measure the neutralized conductivity $C_2$;
(6) record the neutralized conductivity $C_2$;
(7) compute $C_1$–$C_2$, the differential conductivity;
(8) record $C_1$–$C_2$ or alternately generate a related conductivity signal; and
(9) discharge the sample to make way for the next cycle of sampling.

The differential conductivity for digester liquor samples was determined for a pulp digester at various points in the digester. The test results are tabulated in Table I.

the control of pulp digester liquor composition so as to provide a uniformity in digester operation and product quality which has heretofore been impossible. I have in these examples used carbon dioxide as the buffering agent. Other appropriate buffering agents, such as acetic acid, boric acid, gallic acid, citric acid and salicilic acid, for example, may be used.

A batch digester may be controlled in essentially the same manner as described above in connection with the continuous digester; however, instead of removing samples at spaced points along the digester column (which really represent different times of digestion), samples are removed at spaced periods of time and their differential conductivity determined precisely as in the case of the continuous digester. Adjustments to the cooking liquor are made by adding dilution water, white liquor or black liquor, by changing the heat input or by increasing or decreasing the rate of process movement through the digester precisely as mentioned above.

While I have illustrated and described certain present typical practices and embodiments of my invention, it will be understood that this invention may be otherwise embodied within the scope of the following claims.

I claim:

1. The method of controlling the cooking process in a pulp digester comprising the steps of measuring the conductivity of the cooking bath in the digester at at least one point in the cooking process, measuring the neutralized conductivity at the same point, measuring the difference in conductivity between the two said measured values, to provide a value of differential conductivity and adjusting at least one of the control variables temperature, time of processing and liquor strength including the hydroxide concentration in the bath from a curve of differential conductivity versus hydroxide ion concentration prepared from known concentrations of alkaline constituents to modify the contents of the digester to maintain the said contents within previously established parameters in the next processing stage.

2. The method as claimed in claim 1 including withdrawing a sample from the cooking bath, measuring the conductivity of said sample, adding a buffering agent to

TABLE I

[Change in conductivity on neutralization of digester liquor samples with $CO_2$]

| Sample location | Number | Date of sampling | Date of conductivity tests | Conductivity, micromhos/cm. | | | Plant's effective alkali value (lbs./cu. ft.³) | Active alkali #/cu. ft. as $Na_2O$ |
|---|---|---|---|---|---|---|---|---|
| | | | | Initial | Final | Difference | | |
| Top circulation pump | 1 | 1-13-67 | 1-26-67 | 264,000 | 98,800 | 165,200 | 3.61 | 4.39 |
| | 2 | 1-13-67 | 1-26-67 | 256,000 | 97,800 | 158,200 | 3.63 | 4.39 |
| | 3 | 1-16-67 | 1-27-67 | 274,000 | 98,000 | 176,000 | 3.88 | 4.59 |
| | 4 | 1-16-67 | 1-27-67 | 274,000 | 99,800 | 174,200 | 3.89 | 4.61 |
| | 5 | 1-17-67 | 1-30-67 | 274,000 | 98,800 | 175,200 | 3.81 | 4.49 |
| | 6 | 1-17-67 | 1-30-67 | 274,000 | 98,600 | 175,400 | 3.89 | 4.57 |
| Upper cooking pump | 1 | 1-13-67 | 1-26-67 | 120,000 | 70,600 | 49,400 | 1.26 | 1.74 |
| | 2 | 1-13-67 | 1-26-67 | 119,600 | 72,400 | 47,200 | 1.50 | 1.92 |
| | 3 | 1-16-67 | 1-27-67 | 133,600 | 73,800 | 59,800 | 1.50 | 1.92 |
| | 4 | 1-16-67 | 1-27-67 | 122,400 | 71,600 | 50,800 | 1.36 | 1.84 |
| | 5 | 1-17-67 | 1-30-67 | 123,200 | 71,800 | 51,400 | 1.35 | 1.81 |
| | 6 | 1-17-67 | 1-30-67 | 122,000 | 71,400 | 50,600 | 1.32 | 1.78 |
| Lower cooking pump | 1 | 1-13-67 | 1-26-67 | 99,200 | 66,800 | 32,400 | 1.05 | 1.46 |
| | 2 | 1-13-67 | 1-26-67 | 100,800 | 67,400 | 33,400 | 1.05 | 1.46 |
| | 3 | 1-16-67 | 1-27-67 | 98,400 | 66,600 | 31,800 | 1.05 | 1.46 |
| | 4 | 1-16-67 | 1-27-67 | 102,600 | 67,000 | 35,600 | 1.12 | 1.55 |
| | 5 | 1-17-67 | 1-30-67 | 100,800 | 67,400 | 33,400 | 1.09 | 1.50 |
| | 6 | 1 17-67 | 1-30-67 | 103,200 | 68,400 | 34,800 | 1.07 | 1.49 |
| Upper wash extraction | 1 | 1-13-67 | 1-26-67 | 71,000 | 58,400 | 12,600 | 0.56 | 0.92 |
| | 2 | 1-13-67 | 1-26-67 | 67,400 | 58,200 | 9,200 | 0.59 | 0.93 |
| | 3 | 1-16-67 | 1-27-67 | 70,000 | 59,400 | 10,600 | 0.59 | 0.93 |
| | 4 | 1-16-67 | 1-27-67 | 69,000 | 59,400 | 9,600 | 0.60 | 0.94 |
| | 5 | 1-17-67 | 1-30-67 | 72,000 | 59,800 | 12,200 | 0.60 | 0.94 |
| | 6 | 1-17-67 | 1-30-67 | 72,800 | 59,400 | 13,400 | 0.64 | 0.97 |

The differential conductivity versus active alkali and versus effective alkali for the samples shown in Table I are graphed in FIG. 2 of this application.

In the foregoing examples, I have attempted to show the effectiveness of my method of pulp digester control and the manner in which it may be effectively used in said sample, measuring the conductivity of the buffered sample, measuring the difference between the two conductivities so measured to provide a value of differential conductivity, determining the hydroxide concentration from a curve of differential conductivity versus hydroxide ion concentration and adding a hydroxide modifying reagent to bring the level of hydroxide concentration in the bath to a desired level.

3. The method as claimed in claim 1 including the steps of simultaneously drawing two samples from the bath of liquor, measuring the conductivity of one sample, neutralizing and thereafter measuring the conductivity of the other sample, meausring the difference and using said difference as the differential conductivity.

4. The method as claimed in claim 2 wherein the buffering agent is carbon dioxide.

5. The method as claimed in claim 3 wherein the two conductivity measurements are made in separate conductivity cells, each delivering an electrical signal commensurate with the conductivity value at the cell, supplying said signals to a pair of conductivity bridges supplying an output signal and regulating one of the control variables liquor strength, temperature, time of processing and hydroxide ion concentration through a control system actuated by said output signal.

6. The method as claimed in claim 1 wherein the conductivity is measured at spaced apart stages in the cooking process and the neutralized conductivity is measured at the same stages in the cooking process.

7. The method of controlling the process variables of a pulp digester liquor as claimed in claim 1 wherein the conductivity of the cooking bath in the digester is determined at one point and the neutralized conductivity of the digester is determined at a point spaced from said one point.

8. The method of controlling the hydroxide concentration of a pulp digester liquor comprising the steps of measuring the conductivity of the bath liquor in the digester at a point in the cooking process, neutralizing the portion of the bath in which the conductivity has been measured, measuring the neutralized conductivity of the neutralized portion of the bath, measuring the differential conductivity between the original conductivity and the neutralized conductivity, establishing a control condition at the sampling point from the differential conductivity and altering the condition of the bath by changing one of the process variables liquor strength, temperature, time and hydroxide concentration in response to the differential conductivity to move the differential conductivity to a desired point previously measured.

References Cited
UNITED STATES PATENTS 3,553,075    1/1971    Rivers     162—49

S. LEON BASHORE, Primary Examiner

A. D'ANDREA, JR., Assistant Examiner

U.S. Cl. X.R.

162—62, 242